United States Patent
Morita et al.

(10) Patent No.: US 12,435,177 B2
(45) Date of Patent: Oct. 7, 2025

(54) AQUEOUS POLYURETHANE RESIN COMPOSITION AND COATING MATERIAL USING THE COMPOSITION

(71) Applicant: Covestro Deutschland AG, Leverkusen (DE)

(72) Inventors: Hiroshi Morita, Osaka (JP); Kazunori Munakata, Takarazuka (JP); Yingdan Zhu, Shanghai (CN); Long Zhang, Shanghai (CN); Zhirong Fan, Langenfeld (DE)

(73) Assignee: Covestro Deutschland AG, Leverkusen (DE)

( * ) Notice: Subject to any disclaimer, the term of this patent is extended or adjusted under 35 U.S.C. 154(b) by 593 days.

(21) Appl. No.: 17/787,988

(22) PCT Filed: Dec. 22, 2020

(86) PCT No.: PCT/EP2020/087651
§ 371 (c)(1),
(2) Date: Jun. 22, 2022

(87) PCT Pub. No.: WO2021/136727
PCT Pub. Date: Jul. 8, 2021

(65) Prior Publication Data
US 2023/0048853 A1    Feb. 16, 2023

(30) Foreign Application Priority Data

Dec. 30, 2019  (WO) ............... PCT/CN2019/129785
Jan. 15, 2020  (EP) .................................. 20152018

(51) Int. Cl.
*C08G 18/12* (2006.01)
*C08G 18/08* (2006.01)
(Continued)

(52) U.S. Cl.
CPC ......... *C08G 18/12* (2013.01); *C08G 18/0823* (2013.01); *C08G 18/0828* (2013.01); *C08G 18/0866* (2013.01); *C08G 18/302* (2013.01); *C08G 18/3206* (2013.01); *C08G 18/3228* (2013.01); *C08G 18/3271* (2013.01); *C08G 18/3275* (2013.01); *C08G 18/348* (2013.01); *C08G 18/3857* (2013.01); *C08G 18/4808* (2013.01); *C08G 18/4854* (2013.01); *C08G 18/6674* (2013.01); *C08G 18/6681* (2013.01); *C08G 18/6685* (2013.01); *C08G 18/6688* (2013.01); *C08G 18/722* (2013.01); *C08G 18/73* (2013.01); *C08G 18/755* (2013.01); *C08G 18/758* (2013.01); *C09D 175/08* (2013.01); *C08G 2150/00* (2013.01); *C08G 2170/00* (2013.01)

(58) Field of Classification Search
CPC ............... C08G 18/12; C08G 18/0823; C08G 18/0828; C08G 18/0866; C08G 18/3228; C08G 18/4808; C08G 18/4854; C08G 18/6681; C08G 18/302; C08G 18/3206; C08G 18/3271; C08G 18/3275; C08G 18/348; C08G 18/3857; C08G 18/6674; C08G 18/6685; C08G 18/6688; C08G 18/722; C08G 18/73; C08G 18/755; C08G 18/758; C08G 2150/00; C08G 2170/00; C09D 175/08
See application file for complete search history.

(56) References Cited

U.S. PATENT DOCUMENTS 5,637,639 A  6/1997  Duan et al.
5,705,595 A  1/1998  Oda et al.
(Continued)

FOREIGN PATENT DOCUMENTS

CN    107936212 A    4/2018
EP      3502156 A1   6/2019
(Continued)

OTHER PUBLICATIONS

Machine English translation of JP 2015-071684, Morigami et al., Apr. 16, 2015.*
Yong et al., Synthesis and surface analysis of self-matt coating based on waterborne polyurethane resin and study on the matt mechanism, Polym. Bull. 2017, pp. 1061-1076, 74.
International Search Report, PCT/EP2020/087651, date of mailing: Mar. 22, 2021, Authorized officer: Christian Wohnhaas.

*Primary Examiner* — Patrick D Niland
(74) *Attorney, Agent, or Firm* — Richard P. Bender

(57) ABSTRACT

Provided is an aqueous polyurethane resin composition which is excellent in finished appearance as well as excellent in impact resistance, such as chipping resistance, and adhesion.

The aqueous polyurethane resin composition includes a polyurethane resin obtained from at least (a) at least two types of organic diisocyanate compounds and/or polyisocyanate compounds which are different from each other, (b) a polyol compound; (c) an acidic group-containing compounds comprising at least two types of compounds which are a compound containing a carboxyl group as the acid group (a carboxyl group-containing compound) and a compound containing a sulfo group as the acid group (a sulfo group-containing compound); and (d) a chain extender of a polyamine compound, a diamine compound, a polyol compound and/or an alkanolamine compound with a molecular weight of not more than 400, in which the aqueous polyurethane resin composition has a viscosity of not less than 500 Pa·s and not more than 50,000 Pa·s when the polyurethane resin is contained in an amount of 65% by weight.

10 Claims, No Drawings

(51) Int. Cl.
*C08G 18/30* (2006.01)
*C08G 18/32* (2006.01)
*C08G 18/34* (2006.01)
*C08G 18/38* (2006.01)
*C08G 18/48* (2006.01)
*C08G 18/66* (2006.01)
*C08G 18/72* (2006.01)
*C08G 18/73* (2006.01)
*C08G 18/75* (2006.01)
*C09D 175/08* (2006.01)

(56) References Cited

U.S. PATENT DOCUMENTS

2011/0244228 A1 10/2011 Blum et al.
2019/0010272 A1 1/2019 Jin et al.

FOREIGN PATENT DOCUMENTS

| JP | H07166093 A | | 6/1995 |
|----|-------------|---|--------|
| JP | 2004097917 A | | 4/2004 |
| JP | 2007031482 A | | 2/2007 |
| JP | 2015071684 A | * | 4/2015 |

* cited by examiner

AQUEOUS POLYURETHANE RESIN COMPOSITION AND COATING MATERIAL USING THE COMPOSITION

CROSS-REFERENCE TO RELATED APPLICATIONS

This application is a national stage application under 35 U.S.C. 371 of PCT/EP2020/087651, filed Dec. 22, 2020, which claims the benefit of international application no. PCT/CN2019/129785, filed Dec. 30, 2019, and also European application no. 20152018.6, filed Jan. 15, 2020, each of which is incorporated herein by reference.

TECHNICAL FIELD

The present invention relates to an aqueous polyurethane resin composition, which is excellent in finished appearance as well as excellent in impact resistance, such as chipping resistance, and/or adhesion, and to a painting composition, coating composition, ink composition or adhesive composition containing the aqueous polyurethane resin composition.

BACKGROUND ART

Since an aqueous polyurethane resin composition is excellent in adhesion to a substrate, abrasion resistance, impact resistance, solvent resistance, and the like, the aqueous polyurethane resin composition is widely used as a coating material, ink, an adhesive and various coating agents for paper, plastics, film, metal, rubber, elastomers, textile goods and the like (Patent Literatures 1 to 3). To use the aqueous polyurethane resin composition for monocoating or multilayer coating on an electrodeposited metal substrate, it is particularly necessary to continuously improve the finished appearance, impact resistance and adhesion.

CITATION LIST

Patent Literature 1: JP H08-209066 A
Patent Literature 2: JP H07-166093 A
Patent Literature 3: JP 2004-97917 A

SUMMARY OF INVENTION

Technical Problem

An object of the present invention is to provide an aqueous polyurethane resin composition excellent in finished appearance as well as to further provide the aqueous polyurethane resin composition also excellent in impact resistance, such as chipping resistance, and adhesion.

Solution to Problem

As a result of intensive studies, the inventors found that, in an aqueous polyurethane resin composition including a polyurethane resin obtained from constituents including: (a) at least two types of organic diisocyanate compounds and/or polyisocyanate compounds which are different from each other; (b) a polyol compound; (c) acidic group-containing compounds comprising at least two types of compounds which are a compound containing a carboxyl group as the acid group (a carboxyl group-containing compound) and a compound containing a sulfo group as the acid group (a sulfo group-containing compound); and (d) a chain extender which is selected from the group consisting of a polyamine compound, a diamine compound, a polyol compound and an alkanolamine compound, and has a molecular weight of not more than 400, if the aqueous polyurethane resin composition has a viscosity of not less than 500 Pa·s and not more than 50,000 Pa·s when the polyurethane resin is contained in an amount of 65% by weight, the aqueous polyurethane resin composition has excellent finished appearance due to a good flow property obtained by controlling the resin viscosity even in a state where water after application is volatilized and the resin particles are fused and solidified (solid content: 65%). The inventors also found that, by adjusting the component or the like of the aqueous polyurethane resin composition, it is possible to give a coating film having both excellent adhesion to an electrodeposition film and excellent impact resistance such as chipping resistance. Thus, the inventors have come to accomplish the present invention.

The present invention provides the following solutions.

[1] An aqueous polyurethane resin composition comprising a polyurethane resin obtained from at least components (a) to (d) below:
  (a) at least two types of organic diisocyanate compounds and/or polyisocyanate compounds which are different from each other;
  (b) a polyol compound;
  (c) acidic group-containing compounds comprising at least two types of compounds which are a compound containing a carboxyl group as the acid group (a carboxyl group-containing compound) and a compound containing a sulfo group as the acid group (a sulfo group-containing compound); and
  (d) a chain extender selected from the group consisting of a polyamine compound, a diamine compound, a polyol compound and an alkanolamine compound, the chain extender having a molecular weight of not more than 400,
  in which the aqueous polyurethane resin composition has a viscosity of not less than 500 Pa·s and not more than 50,000 Pa·s when the polyurethane resin is contained in an amount of 65% by weight.

[2] The aqueous polyurethane resin composition according to [1], in which the acidic group-containing compound of the component (c) is a compound having two or more hydroxy groups or amino groups.

[3] The aqueous polyurethane resin composition according to [1] or [2], in which at least two types of organic diisocyanate compounds which are different from each other are included as the component (a).

[4] The aqueous polyurethane resin composition according to any one of [1] to [3], in which the organic diisocyanate compounds include at least one type of alicyclic diisocyanate compound.

[5] The aqueous polyurethane resin composition according to any one of [1] to [4], in which at least one type of the organic diisocyanate compounds is an alicyclic diisocyanate compound selected from 4,4'-diisocyanatodicyclohexylmethane and isophorone diisocyanate, and the alicyclic diisocyanate compound is contained by a percentage of not more than 80 mol % based on 100 mol % of the organic diisocyanate compounds of the component (a).

[6] The aqueous polyurethane resin composition according to any one of [1] to [5], in which the polyol compound of the component (b) contains polyether polyol.

[7] The aqueous polyurethane resin composition according to any one of [1] to [6], in which the component (b) is polytetramethylene glycol polyol.

[8] The aqueous polyurethane resin composition according to any one of [1] to [7], in which the component (b) has an average molecular weight of more than 400 g/mol and not more than 6000 g/mol.

[9] The aqueous polyurethane resin composition according to any one of [1] to [8], in which the percentage of the component (b) contained in the polyurethane resin is not less than 60% by weight.

[10] The aqueous polyurethane resin composition according to any one of [1] to [9], in which the component (c) is present in the polyurethane resin in an amount that a total weight of the carboxyl group-containing compound and the sulfo group-containing compound is 0.2 to 10% by weight, preferably 0.5 to 5% by weight.

[11] The aqueous polyurethane resin composition according to any one of [1] to [10], in which a ratio of an acid value of the carboxylic group to a total acid value in the component (c) is 0.20 to 0.95, more preferably 0.50 to 0.90, still more preferably 0.70 to 0.85.

[12] The aqueous polyurethane resin composition according to any one of [1] to [1], in which the acid value of the carboxylic group in the polyurethane resin is preferably in the range from 4.5 to 30 mgKOH/g, more preferably in the range from 5 to 25 mg KOH/g, still more preferably in the range from 6 to 22 mgKOH/g.

[13] The aqueous polyurethane resin composition according to any one of [1] to [12], in which the polyurethane resin is contained by a percentage of 20 to 65% by weight.

[14] A painting composition, coating composition, ink composition or adhesive composition containing the aqueous polyurethane resin composition according to any one of [1] to [13].

Advantageous Effects of Invention

According to the aqueous polyurethane resin composition of the present invention, it is possible to provide an aqueous polyurethane resin composition excellent in finished appearance as well as to further provide the aqueous polyurethane resin composition also excellent in impact resistance, such as chipping resistance, and adhesion.

DESCRIPTION OF EMBODIMENTS

The present invention provides an aqueous polyurethane resin composition including a polyurethane resin obtained from: (a) at least two types of organic diisocyanate compounds and/or polyisocyanate compounds which are different from each other; (b) a polyol compound; (c) acidic group-containing compounds comprising at least two types of compounds which are a compound containing a carboxyl group as the acid group (a carboxyl group-containing compound) and a compound containing a sulfo group as the acid group (a sulfo group-containing compound); and (d) a chain extender selected from the group consisting of a polyamine compound, a diamine compound, a polyol compound and an alkanolamine compound, the chain extender having a molecular weight of not more than 400, in which the aqueous polyurethane resin composition has a viscosity of not less than 500 Pa·s and not more than 50,000 Pa·s when the polyurethane resin is contained in an amount of 65% by weight.

[Component (a): Organic Diisocyanate Compounds and Polyisocyanate Compounds]

In the present invention, the component (a) is at least two types of organic diisocyanate compounds and/or polyisocyanate compounds which are different from each other.

The organic diisocyanate compounds of the component (a) are organic compounds having two free isocyanate groups per molecule and can be exemplified by diisocyanate $Y(NCO)_2$ [where Y is a $C_{4-12}$ divalent aliphatic hydrocarbon group (=an aliphatic diisocyanate compound), a $C_{6-15}$ divalent alicyclic hydrocarbon group (=an alicyclic diisocyanate compound), a $C_{6-15}$ divalent aromatic hydrocarbon group (=an aromatic diisocyanate compound) or a $C_{7-15}$ divalent araliphatic hydrocarbon group]. Examples of such organic diisocyanate compounds include tetramethylene diisocyanate, methylpentamethylene diisocyanate, 1,5-pentamethylene diisocyanate, hexamethylene diisocyanate (=HDI), dodecamethylene diisocyanate, 1,2-bis(isocyanatomethyl)cyclohexane, 1,4-diisocyanatocyclohexane, 1-isocyanato-3,3,5-trimethyl-5-isocyanatomethylcyclohexane (=IPDI, isophorone diisocyanate), 4,4'-diisocyanatodicyclohexylmethane, 4,4'-diisocyanatodicyclohexylpropane-(2,2), 1,4-diisocyanatobenzene, 2,4-diisocyanatotoluene, 2,6-diisocyanatotoluene, 4,4'-diisocyanatodiphenylmethane, 2,2'-diisocyanatodiphenylmethane, 2,4'-diisocyanatodiphenylmethane, tetramethylxylylene diisocyanate, p-xylylene diisocyanate, p-isopropylidene diisocyanate and 1,5-diisocyanatonaphthalene.

The organic polyisocyanate compounds of the component (a) are polyisocyanate having three or more isocyanate groups per molecule. Such organic polyisocyanate compounds can be exemplified by polyisocyanate, which is, for example, prepared by modification of aliphatic, alicyclic, araliphatic and/or aromatic diisocyanate, composed of at least two types of diisocyanate, and has an uretdione, isocyanurate, urethane, allophanate, biuret, carbodiimide, iminooxadiazinedione and/or oxadiazinetrione structure. An example of unmodified polyisocyanate having three or more isocyanate groups per molecule includes 4-isocyanatomethyl-1,8-octane diisocyanate (nonane triisocyanate).

The component (a) preferably includes at least two types of organic diisocyanate compounds different from each other.

In order for the coating film to have high breaking strength and enhance durability, the organic diisocyanate compounds of the component (a) preferably include at least one type of alicyclic diisocyanate compound.

In order to facilitate reaction control, the component (a) preferably include at least one type of alicyclic diisocyanate compound selected from 4,4'-diisocyanatodicyclohexylmethane and isophorone diisocyanate.

The component (a) contains the alicyclic diisocyanate compound by a percentage of preferably not more than 80 mol %, more preferably 20 to 70 mol %, still more preferably 40 to 60 mol % based on 100 mol % of the organic diisocyanate compounds of component (a). Since the alicyclic diisocyanate compound may reduce impact resistance such as chipping resistance in some cases when the proportion thereof is too high in the organic diisocyanate compound, the alicyclic diisocyanate compound is preferably within the above specified ranges.

The component (a) is preferably a combination of an aliphatic diisocyanate compound and an alicyclic diisocyanate compound selected from 4,4'-diisocyanatodicyclohexylmethane, isophorone diisocyanate and a mixture thereof.

The component (a) is more preferably a combination of an alicyclic diisocyanate compound selected from 4,4'-diisocyanatodicyclohexylmethane or isophorone diisocyanate and hexamethylene diisocyanate (=HDI) which is an aliphatic diisocyanate compound.

The component (a) contained in the polyurethane resin by a percentage is usually 5 to 30% by weight, preferably 10 to 25% by weight, more preferably 13 to 20% by weight.

[Component (b): Polyol Compound]

The polyol compound of the component (b) has a molecular weight of more than 400 and has at least two isocyanate-reactive hydroxyl groups. Examples of the polyol compound include polyether polyol, polyester polyol, polycarbonate polyol, polyester polycarbonate polyol, polylactone polyol, polybutadiene polyol and silicone polyol.

A preferred component (b) preferably has two to four, particularly preferably two to three, most preferably two hydroxyl groups. Moreover, the component (b) may also be a mixture of various compounds of such type.

Examples of the polyether polyol include cyclic ether polyadducts and polyhydric alcohol condensates. Examples of the cyclic ether include styrene oxide, ethylene oxide, propylene oxide, tetrahydrofuran, butylene oxide and epichlorohydrin, and these may be used alone or in combination. Examples of the polyhydric alcohol include the aforementioned diols and highly functional polyols, and these may be used alone or in combination. For example, the polyadduct of tetrahydrofuran is known as polytetramethylene ether glycol (PTMG).

The polyester polyol can be produced by adjusting the production conditions of the polyester and is polyester having hydroxyl groups at least at both ends of the main chain. Examples of the polyester polyol include linear polyester diol and slightly branched polyester polyol. These can be prepared by a known method using aliphatic, alicyclic or aromatic dicarboxylic acids and diols and optionally using polycarboxylic acids and/or highly functional polyols.

The polylactone polyol is a homopolymer or copolymer of lactones, which is a polylactone prepared so as to have hydroxyl groups at least at both ends of the main chain.

The polycarbonate polyol is polycarbonate having hydroxyl groups at least at both ends of the main chain, which is produced by adjusting the production conditions of the polycarbonate.

The silicone polyol includes silicone oils having a hydroxyl group at the end having a siloxane bond in the molecule.

The polyol compound of the component (b) preferably includes polyether polyol.

When the component (b) includes polyether polyol, the polyether polyol contained in the component (b) by a percentage is preferably 50 to 100% by weight, more preferably 60 to 100% by weight, still more preferably 75 to 100% by weight. When the content percentage is not less than 50%, the strength is increased. In addition, an optional component, such as polycarbonate polyol, can be used in combination, and the content percentage thereof is not more than 50% by weight, preferably not more than 40% by weight, still more preferably not more than 25%.

The average molecular weight of the polyol compound of the component (b), particularly the average molecular weight of polytetramethylene glycol polyol is more than 400 g/mol and not more than 6000 g/mol, preferably 800 to 5000 g/mol, more preferably 1000 to 4000 g/mol. When the average molecular weight is more than 400 g/mol, sufficient adhesion of the coating film to the substrate can be obtained. When the average molecular weight is not more than 6000 g/mol, the dispersion stability of the aqueous polyurethane resin composition and/or the finished appearance of the coating film can be improved.

From the viewpoint of the adhesion of the coating film, the component (b) contained in the polyurethane resin by a percentage is preferably not less than 60% by weight, more preferably 65 to 85% by weight, still more preferably 70 to 85% by weight.

Note that, in this specification, the polyol compound of the component (b) excludes the acidic group-containing diol compound of the component (c).

[Component (c): Acidic Group-Containing Compound]

The acidic group-containing compounds of the component (c) includes at least two types of compounds which are a compound containing a carboxyl group as the acid group (a carboxyl group-containing compound) and a compound containing a sulfo group as the acid group (a sulfo group-containing compound).

The acidic group-containing compound of the component (c) is preferably a compound having at least two or more hydroxy groups or amino groups.

For the component (c), a combination of the carboxyl group-containing compound and the sulfo group-containing compound enhances the emulsification/dispersibility of the polyurethane resin in water even at a low acid value. Moreover, when the combination is mixed with other emulsion resins, pigments, additives, solvents or the like to be used as a coating material, the mixture has excellent storage stability and is stable at low viscosity even with a high solid content.

The component (c) is present in the polyurethane resin in an amount that the total weight of the carboxyl group-containing compound and the sulfo group-containing compound is preferably 0.2 to 10% by weight, more preferably 0.5 to 5% by weight. When the amount is not less than 0.2% by weight, sufficient water dispersibility is obtained. When the amount is not more than 10% by weight, the strength and water resistance of the coating film are improved.

The ratio of an acid value of the carboxylic group to the total acid value in the component (c) is preferably 0.20 to 0.95, more preferably 0.50 to 0.90, still more preferably 0.70 to 0.85. The acid value herein refers to a calculated value (mgKOH/g) expressed in the number of mg of potassium hydroxide required to neutralize the carboxyl group or the sulfo group present in the polyurethane resin. The total acid value refers to the sum total of the acid value of the carboxyl group and the acid value of the sulfo group.

Specific examples of the acidic group-containing compound of the component (c) include N-(2-aminoethyl)-2-aminoethanesulfonic acid, N-(3-aminopropyl)-2-aminoethanesulfonic acid, N-(3-aminopropyl)-3-aminopropanesulfonic acid, N-(2-aminoethyl)-3-aminopropanesulfonic acid, 2,2-dimethylolpropionic acid, 2,2-dimethylolbutanoic acid, N,N-bishydroxyethylalanine, 3,4-dihydroxybutanesulfonic acid, 3,6-dihydroxy-2-toluenesulfonic acid, and sodium salts, lithium salts, potassium salts, tertiary amine salts and the like which are reaction products obtained by Michael addition of diamine (e.g., 1,2-ethanediamine or isophorone diamine) with twice the molar quantity of acrylic acid or maleic acid.

The acidic group-containing compound of the component (c) is preferably an acidic group-containing diol compound, including an acidic group-containing diol compound having 4 to 12 carbon atoms, such as 2,2-dimethylolpropionic acid, 2,2-dimethylolbutanoic acid, N,N-bishydroxyethylglycine, N,N-bishydroxyethylalanine, 3,4-dihydroxybutanesulfonic acid and 3,6-dihydroxy-2-toluenesulfonic acid.

The acidic group-containing compound of the component (c) may be those including ionic groups such as dihydroxycarboxylic acid, diaminocarboxylic acid, dihydroxysulfonic acid, diaminosulfonic acid and salts thereof, or those capable of forming ionic groups. Examples thereof include dimethylolpropionic acid, hydroxypivalic acid, 2-(2-aminoethyl-amino)ethanesulfonic acid, ethylenediaminepropyl or butylsulfonic acid, 1,2- or 1,3-propylenediamine-β-ethylsulfonic acid, lysine, 3,5-diaminobenzoic acid and the alkali and/or ammonium salts thereof; an adduct of sodium hydrogensulfate to butene-2-diol-1,4, polyethersulfone, a propoxylated adduct of 2-butenediol and NaHSO$_3$ (German Patent Specification DE-A 24 46 440) and, for example, structural units that can be converted into a cationic group such as N-methyldiethanolamine.

[Component (d): Polyamine Compound, Diamine Compound, Polyol Compound and Alkanolamine Compound as Chain Extender]

The component (d) is a polyamine compound, a diamine compound, a polyol compound and/or an alkanolamine compound as a chain extender, and the molecular weight of these compounds is not more than 400.

The polyamine compound of the component (d) is polyamine having a total of three or more amino groups and/or imino groups in one molecule. Examples of the polyamine compound include triamine compounds such as diethylenetriamine, bis(2-aminopropyl)amine and bis(3-aminopropyl)amine; tetramine compounds such as triethylenetetramine, tripropylenetetramine, N-(benzyl)triethylenetetramine, N,N'''-(dibenzyl)triethylenetetramine and N-(benzyl)-N'''-(2-ethylhexyl)triethylenetetramine; pentamine compounds such as tetraethylenepentamine and tetrapropylenepentamine; hexamine compounds such as pentaethylenehexamine and pentapropylenehexamine; and polyamine compounds such as polyethyleneimine and polypropyleneimine. From the viewpoint of the reactivity with a polyurethane prepolymer, polyamine is preferably polyamine having two amino groups and one or more imino groups, such as diethylenetriamine, triethylenetetramine, bis(2-aminopropyl)amine, bis(3-aminopropyl)amine, tripropylenetetramine, tetraethylenepentamine, tetrapropylenepentamine, pentaethylenehexamine or pentapropylenehexamine.

Examples of the diamine compound of the component (d) include hydrazine, 1,2-ethanediamine, 1,4-tetramethylenediamine, 2-methyl-1,5-pentanediamine, 1,6-hexamethylenediamine, 1,4-hexamethylenediamine, 3-aminomethyl-3,5,5-trimethylcyclohexylamine, 1,3-bis(aminomethyl)cyclohexane, xylylenediamine, piperazine, 2,5-dimethylpiperazine and the like.

The polyol compound of the component (d) is a compound having two or more hydroxyl groups. Examples thereof include ethanediol, diethylene glycol, triethylene glycol and tetraethylene glycol, 1,2-propanediol, dipropylene glycol, tripropylene glycol, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylcyclohexane, 1,8-octanediol, 1,10-decanediol, 1,12-dodecanediol, neopentyl glycol, 1,4-cyclohexanediol, 1,4-cyclohexanedimethanol, 1,4-dihydroxybenzene, 1,3-dihydroxybenzene, 1,2-dihydroxybenzene, 2,2-bis(4-hydroxyphenyl)-propane (bisphenol A), TCD-diol, trimethylolpropane, glycerol, pentaerythritol and dipentaerythritol.

Examples of the alkanolamine compound of the component (d) include ethanolamine, propanolamine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine, N-ethylethanolamine and the like.

For the chain extender of the component (d), one type may be used alone, or a plurality of types may be used in combination.

The amount of the chain extender of the component (d) is preferably not more than the equivalent of the residual isocyanate group that becomes the chain extension origin in the polyurethane prepolymer, more preferably 0.7 to 0.99 equivalent of the residual isocyanate group. When the amount of the chain extender of the component (d) is not more than the equivalent of the residual isocyanate group, preferably not more than 0.99 equivalent, a decrease in the molecular weight of the chain-extended polyurethane resin tends to be suppressed, and the strength of the coating film obtained by applying the resulting aqueous polyurethane resin dispersion tends to be improved.

Apart from the component (d), for example, an amino polyol compound, water or the like may be used as a further chain extender.

The aqueous polyurethane resin composition can include monoalcohol and monoamine as further optional components.

The addition amount of monoalcohol and monoamine is preferably less than 5% by weight, more preferably less than 2% by weight based on the solid content of the aqueous polyurethane resin.

[Method for Producing Aqueous Polyurethane Resin Composition]

A method for producing an aqueous polyurethane resin composition is not particularly limited, but examples thereof include the following methods.

The method for producing the aqueous polyurethane resin composition includes the steps of: obtaining a polyurethane prepolymer by reacting (a) at least two types of organic diisocyanate compounds and/or polyisocyanate compounds which are different from each other, (b) the polyol compound and (c) the acidic group-containing compound; neutralizing the acidic groups in the polyurethane prepolymer; dispersing the polyurethane prepolymer in an aqueous medium; and obtaining the aqueous polyurethane resin composition including a polyurethane resin by reacting the polyurethane prepolymer with (d) the chain extender which is selected from the group consisting of the polyamine compound, the diamine compound, the polyol compound and the alkanolamine compound and has a molecular weight of not more than 400.

In the method for producing the aqueous polyurethane resin composition, the step of neutralizing the acidic groups and the step of dispersing the polyurethane prepolymer in the aqueous medium may be performed separately or together. In the method for producing the aqueous polyurethane resin composition, the step of reacting the polyurethane prepolymer with the chain extender may be after the step of dispersing the polyurethane prepolymer in the aqueous medium or may be performed together with the step of dispersing the polyurethane prepolymer in the aqueous medium.

Each step in the method for producing the aqueous polyurethane resin composition may be performed under an inert gas atmosphere or may be performed in the atmosphere.

The polyurethane resin composition of the present invention is preferably a dispersion which includes a polyurethane resin and is dispersed in an aqueous medium. The polyurethane resin composition of the present invention includes at least water as the aqueous medium and may contain, as a co-solvent, an organic solvent [a ketone-based solvent (e.g., acetone and methyl ethyl ketone), an ester-based solvent (e.g., ethyl acetate), an ether-based solvent (e.g., tetrahydrofuran), an amide-based solvent (e.g., N,N-dimethylformamide and N-methylpyrrolidone), an alcohol-based solvent (e.g., isopropyl alcohol), and an aromatic hydrocarbon-based solvent (e.g., toluene and the like). An amount of the co-solvent contained in the polyurethane resin composition of the present invention is preferably not more than 10% by weight. Moreover, the proportion of the water in the aqueous medium is preferably not less than 40% by weight.

The solid content concentration (the component content other than the volatile components) of the water dispersion of the aqueous polyurethane resin obtained in the present invention is preferably 20 to 65% by weight, more preferably 30 to 60/o by weight from the viewpoint of easy handling of the water dispersion. The solid content concentration can be obtained as follows: about 1 g of the water dispersion is thinly spread on a Petri dish; the water dispersion is precisely weighed; then the weight after heating at 130° C. for 45 minutes using a circulating constant temperature dryer is precisely weighed; and the ratio (percentage) of the remaining weight after heating to the weight before heating is calculated.

The aqueous polyurethane resin composition can contain a neutralizer as an optional component. The neutralizer is used to neutralize at least some of the acidic groups of the polyurethane prepolymer and disperse the polyurethane prepolymer in the aqueous medium. Examples of the neutralizer include: tertiary amine compounds such as trialkylamines including trimethylamine, triethylamine, tributylamine and the like, N,N-dialkylalkanolamines including N,N-dimethylethanolamine, N,N-dimethylpropanolamine, N,N-dipropylethanolamine, 1-dimethylamino-2-methyl-2-propanol and the like, N-alkyl-N,N-dialkanolamines, and trialkanolamines including triethanolamine; inorganic alkali salts of potassium hydroxide, sodium hydroxide and the like; ammonia and the like. These may be used alone or in combination of two or more.

From the viewpoint of workability, the neutralizer is preferably organic amines, more preferably N,N-dimethylethanolamine. The amount of the neutralizer is, for example, 0.4 to 1.2 equivalent, preferably 0.6 to 1.0 equivalent per equivalent of acidic groups possessed by the aqueous polyurethane resin composition.

The aqueous polyurethane resin composition of the present invention has a viscosity of not less than 500 Pa·s and not more than 50,000 Pa·s when the polyurethane resin is contained in an amount of 65% by weight. When the polyurethane resin is contained in an amount of 80% by weight, the viscosity change rate is not more than 350%, preferably not more than 250%, particularly preferably not more than 150%. The aqueous polyurethane resin composition of the present invention has the above-specified viscosity to provide a painting composition, coating composition, ink composition and adhesive composition excellent in finished appearance.

In this specification, the viscosity at the time of a high solid content of the aqueous polyurethane resin composition is measured using a rheometer after the liquid temperature is adjusted to 25° C. Note that, when the polyurethane resin is contained in an amount of less than 65% by weight in the aqueous polyurethane resin composition, for example, it is possible to measure the viscosity when the polyurethane resin is contained in an amount of not less than 65% by weight, by evaporating the aqueous medium in the aqueous polyurethane resin composition using an evaporator or the like to adjust the amount of the polyurethane resin contained.

[Viscosity Change Rate]

The "viscosity change rate" in the present invention indicates a change in the viscosity when the solid content of the aqueous polyurethane resin composition is increased from 65% by weight to 80% by weight, and is determined by the following calculation method. Note that a value measured by a rheometer at 25° C. is used for the viscosity at the time of a high solid content.

(Viscosity Change Rate (%))={(Viscosity When Solid Content is 80% by Weight)−(Viscosity When Solid Content is 65% by weight)}/(Viscosity When Solid Content is 65% by Weight)×100

The average molecular weight of the polyurethane resin in the aqueous polyurethane resin composition of the present invention is not particularly limited and can be selected in a range that gives dispersibility and a good coating film as an aqueous coating material, which is preferably 5000 to 500000, more preferably 10000 to 100000. In this specification, the average molecular weight of the polyurethane resin is a weight average molecular weight measured by gel permeation chromatography, and polystyrene is used as a standard substance.

The acid value of the carboxylic group in the polyurethane resin in the aqueous polyurethane resin composition of the present invention is preferably in the range from 4.5 to 30 mgKOH/g, more preferably in the range from 5 to 25 mgKOH/g, still more preferably in the range from 6 to 22 mgKOH/g. In this specification, the acid value of the resin means the number of mg of potassium hydroxide required to neutralize 1 g of the resin. The acid value is a value measured in accordance with the indicator titration method of JIS K 1557.

The hydroxyl value of the polyurethane resin in the aqueous polyurethane resin composition of the present invention is not particularly limited, but is usually in the range from 1 to 100 mgKOH/g. In this specification, the hydroxyl value of the resin means the number of milligrams (mg) of potassium hydroxide equivalent to the hydroxyl groups in 1 g of the resin. The hydroxyl value is a value measured in accordance with the indicator titration method of Method B of JIS K 1557.

The aqueous polyurethane resin composition of the present invention can be used alone or together with a binder, auxiliary and additive (particularly an emulsifier, a light stabilizer such as an ultraviolet absorber and sterically hindered amine (HALS), an antioxidant, a filler, an auxiliary such as an antisettling agent, an antifoaming agent and/or a wetting agent, a flow improver, a reactive diluent, a plasticizer, a neutralizer, a catalyst, an auxiliary solvent and/or a thickener, as well as an additive such as a pigment, a colorant or a flatting agent) known in the coating and adhesive arts. A tackifier can also be added. The additive can be added to the product of the present invention just before processing. However, it is also possible to add at least part of the additive before or during the dispersion of the binder.

[Painting Composition and the Like Containing Aqueous Polyurethane Resin Composition]

The present invention also relates to a painting composition, coating composition, ink composition and adhesive composition containing the aqueous polyurethane resin composition described above.

In addition to the aqueous polyurethane resin composition, another resin may be added to the painting composition, coating composition, ink composition and adhesive composition of the present invention.

Examples of another resin include a polyester resin, an acrylic resin, a polyether resin, a polycarbonate resin, a polyurethane resin, an epoxy resin, an alkyd resin, a polyolefin resin, a vinyl chloride resin and the like. These may be used alone or in combination of two or more.

From the viewpoint of dispersibility in water, another resin preferably has one or more types of hydrophilic groups. The hydrophilic groups include a hydroxyl group, a carboxy group, a sulfo group, a polyethylene glycol group and the like.

The polyester resin can be usually produced by esterification or transesterification between an acid component and an alcohol component. For the acid component, a compound normally used as an acid component to produce a polyester resin can be used. For example, an aliphatic polybasic acid, an alicyclic polybasic acid, an aromatic polybasic acid or the like can be used as the acid component.

The acrylic resin is preferably a hydroxyl group-containing acrylic resin, for example. The hydroxyl group-containing acrylic resin can be produced by a known method such as, for example, a solution polymerization method in an organic solvent or an emulsion polymerization method in water, in which a hydroxyl group-containing polymerizable unsaturated monomer is copolymerized with another polymerizable unsaturated monomer copolymerizable with the hydroxyl group-containing polymerizable unsaturated monomer.

The hydroxyl group-containing polymerizable unsaturated monomer is a compound having one or more hydroxyl group and one or more polymerizable unsaturated bond in one molecule. Examples thereof include: monoesterified products from a (meth)acrylic acid and a dihydric alcohol having 2 to 8 carbon atoms, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone modified products of these monoesterified products; N-hydroxymethyl (meth)acrylamide; allyl alcohol; (meth)acrylate having a polyoxyethylene chain with a hydroxyl group at the molecular end; and the like.

The hydroxyl group-containing acrylic resin preferably has an anionic functional group. The hydroxyl group-containing acrylic resin having an anionic functional group can be produced by, for example, using a polymerizable unsaturated monomer having an anionic functional group such as a carboxylic acid group, a sulfonic acid group or a phosphoric acid group as one type of the polymerizable unsaturated monomer.

Examples of the polyether resin include a polymer or copolymer having an ether bond, such as polyoxyethylene-based polyether, polyoxypropylene-based polyether, polyoxybutylene-based polyether, polyether derived from an aromatic polyhydroxy compound including bisphenol A, bisphenol F or the like, and the like.

Examples of the polycarbonate resin include polymers produced from bisphenol A, 3-methyl-1,5-pentanediol and 1,6-hexanediol.

Examples of the epoxy resin include a resin obtained by reaction of a bisphenol compound with epichlorohydrin, and the like. Examples of the bisphenol include bisphenol A and bisphenol F.

Examples of the alkyd resin include alkyd resins obtained, for example, by reacting a polybasic acid such as phthalic acid, terephthalic acid or succinic acid and polyhydric alcohol further with a modifier such as fat and oil/fat and oil acid (soybean oil, flaxseed oil, palm oil, stearic acid or the like) or a natural resin (rosin, succinite or the like).

Examples of the polyolefin resin include a resin obtained by subjecting a polyolefin resin, which is obtained by polymerizing or copolymerizing an olefin-based monomer with another monomer in accordance with a normal polymerization method as appropriate, to water dispersion using an emulsifier or by emulsion polymerization of an olefin-based monomer together with another monomer as appropriate. Moreover, in some cases, a so-called chlorinated polyolefin-modified resin, which is obtained by chlorinating the polyolefin resin, may be used.

Examples of the olefin-based monomer include α-olefin such as ethylene, propylene, I-butene, 3-methyl-1-butene, 4-methyl-1-pentene, 3-methyl-1-pentene, 1-heptene, 1-hexene, 1-decene and 1-dodecene; and conjugated dienes and nonconjugated dienes such as butadiene, ethylidene norbornene, dicyclopentadiene, 1,5-hexadiene and styrenes. These monomers may be used alone or in combination of two or more.

Examples of another monomer copolymerizable with the olefin-based monomer include vinyl acetate, vinyl alcohol, maleic acid, citraconic acid, itaconic acid, maleic anhydride, citraconic anhydride and itaconic anhydride. These monomers may be used alone or in combination of two or more.

The painting composition, coating composition, ink composition and adhesive composition of the present invention can further include a curing agent. By including a curing agent, it is possible to improve the durability of a painting film, a multilayer painting film, a coating film or a printed matter obtained by using the coating composition, ink composition or adhesive composition.

For example, polyisocyanate, blocked polyisocyanate, melamine resin, carbodiimide, oxazoline, aziridine, hydrazine or the like can be used as the curing agent. Note that these curing agents may be used along or in combination of two or more.

The polyisocyanate is not particularly limited as long as the polyisocyanate has two or more isocyanate groups in the molecule, and examples thereof include those the same as those exemplified as the polyisocyanate compounds (a).

The blocked polyisocyanate is not particularly limited as long as the blocked polyisocyanate has two or more block isocyanate groups in the molecule, and examples thereof include the polyisocyanate compounds (a) or compounds obtained by giving hydrophilicity to the polyisocyanate compounds (a) blocked by a known blocking agent [phenols, secondary or tertiary alcohols, oximes, aliphatic or aromatic secondary amines, phthalic imides, lactams, an active methylene compound (malonic acid dialkyl ester or the like), a pyrazole-based compound (pyrazole, 3,5-dimethylpyrazole or the like), acidic sodium sulfite, and the like] or the like.

The melamine resin is not particularly limited, and one normally used as a curing agent can be used. For example, the melamine resin is preferably an alkyl etherified melamine resin obtained by alkyl etherification, more preferably a melamine resin substituted with a methoxy group and/or a butoxy group. Such a melamine resin includes: those having a methoxy group alone, such as Cymel 325, Cymel 327, Cymel 370 and My Coat 723; those having both a methoxy group and a butoxy group, such as Cymel 202, Cymel 204, Cymel 211, Cymel 232, Cymel 235, Cymel 236, Cymel 238, Cymel 251, Cymel 254, Cymel 266, Cymel 267 and Cymel 285 (all of them are trade names, manufactured by Nippon Cytec Industries, Ltd.); and those having a butoxy group alone, such as My Coat 506 (a trade name, manufactured by Mitsui-Cytec Ltd.), U-VAN 20N60 and U-VAN 20SE (all of them are trade names, manufactured by Mitsui Chemicals, Inc.). These may be used alone or in combination of two or more. Of these, Cymel 211, Cymel 251, Cymel 285, Cymel 325, Cymel 327, and My Coat 723 are more preferable.

The carbodiimide is not particularly limited as long as the carbodiimide is a compound having two or more carbodiimide groups in the molecule. For example, aliphatic polycarbodiimide [poly(hexamethylenecarbodiimide) and the like], alicyclic polycarbodiimide [poly(4,4'-dicyclohexylmethanecarbodiimide) and the like] and aromatic polycarbodiimide [poly(p-phenylenecarbodiimide), poly(4,4'-diphenylmethanecarbodiimide), poly(diisopropylphenylcarbodiimide) and the like], which are obtained by polymerizing the aromatic polyisocyanate having 8 to 26 carbon atoms, aliphatic polyisocyanate having 4 to 22 carbon atoms, alicyclic polyisocyanate having 8 to 18 carbon atoms or araliphatic polyisocyanate having 10 to 18 carbon atoms, can be used. "Carbodilite V-01", "Carbodilite V-02", "Carbodilite V-03", "Carbodilite V-04", "Carbodilite V-05", "Carbodilite V-07", "Carbodilite V-09". "Carbodilite E-02", "Carbodilite E-03A", "Carbodilite E-04" manufactured by Nisshinbo Chemical Inc. and the like can be listed as commercially available products.

The oxazoline is not particularly limited as long as the oxazoline is a compound having two or more oxazoline groups (oxazoline backbone) in the molecule. Examples thereof include: a compound having two or more oxazoline groups, such as 2,2'-isopropylidenebis(4-phenyl-2-oxazoline); a (co)polymer of polymerizable oxazoline compounds such as 2-isopropenyl-2-oxazoline, 2-vinyl-2-oxazoline and 2-vinyl-4-methyl-2-oxazoline; a copolymer of the polymerizable oxazoline compounds and a copolymerizable monomer that does not react with the oxazoline groups [(meth)acrylic esters, such as methyl (meth)acrylate, ethyl (meth)acrylate, hydroxyethyl (meth)acrylate and polyethylene glycol (meth)acrylate, (meth)acrylic acid amide vinyl acetate, styrene, α-methylstyrene sodium styrenesulfonate or the like]; and the like. "Epocros K-2010E", "Epocros K-2020E" and "Epocros WS-500" manufactured by Nippon Shokubai Co., Ltd. and the like can be listed as commercially available products.

The aziridine is not particularly limited as long as the aziridine is a compound having two or more aziridinyl groups in the molecule. Examples thereof include tetramethylolmethane tris(0-aziridinylpropionate) and trimethylolpropane tris(β-aziridinylpropionate).

The hydrazine include hydrazine and compounds having two or more hydrazine groups (hydrazine backbone) in the molecule [e.g., dicarboxylic acid dihydrazide having 2 to 10 carbon atoms (oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide and the like) and alkylene dihydrazine having 2 to 10 carbon atoms (ethylene dihydrazine, 1,3-propylene dihydrazine, 1,4-butylene dihydrazine, 1,6-hexylene dihydrazine or the like)].

A color pigment, an extender pigment and a bright pigment can be added to the painting composition, coating composition and ink composition of the present invention.

Examples of the color pigment include titanium oxide, zinc white, carbon black, molybdenum red, Prussian blue, cobalt blue, azo pigment, phthalocyanine pigment, quinacridone pigment, isoindoline pigment, selenium-based pigment, perylene pigment and the like. It is preferable to use titanium oxide and/or carbon black as the color pigment. Note that these may be used alone or in combination of two or more.

Examples of the extender pigment include clay, kaolin, barium sulfate, barium carbonate, calcium carbonate, talc, silica and alumina white. It is preferable to use barium sulfate and/or talc as the extender pigment, and barium sulfate is more preferably used. Note that these may be used alone or in combination of two or more.

For example, aluminum, copper, zinc, brass, nickel, aluminum oxide, mica, aluminum oxide coated with titanium oxide or iron oxide, or mica coated with titanium oxide or iron oxide can be used as the bright pigment.

The painting composition, coating composition, ink composition and adhesive composition of the present invention can contain ordinary additives, such as a thickener, a curing catalyst, an ultraviolet absorber, a light stabilizer, an antifoaming agent, a plasticizer, a surface conditioner and an antisettling agent, depending on the function or use thereof. Note that these may be used alone or in combination of two or more, or a commercially available product may be used as it is.

A method for producing the painting composition, coating composition, ink composition or adhesive composition of the present invention is not particularly limited and can adopt a known production method. However, the painting composition, coating composition, ink composition and adhesive composition are suitably produced by mixing the aqueous polyurethane resin composition with various resins and additives mentioned above, further adding the aqueous medium, and adjusting the viscosity for the application method.

Suitable materials for a material to which the painting composition, coating composition, ink composition and adhesive composition of the present invention are applied include: metal materials usually used for automobile bodies or parts, road materials, building materials for home, and the like (e.g., an electrodeposition-coated steel sheet, a phosphated steel sheet, a galvanized steel sheet, a cold rolled steel sheet, an aluminum sheet, a stainless sheet, a zinc phosphate treated steel sheet, an iron phosphate treated steel sheet and the like); or plastic materials such as polyurethane, polycarbonate, polybutylene terephthalate, polyamide, polyphenylene oxide, an acrylonitrile/butadiene/styrene copolymer (i.e., ABS resin), polypropylene and unsaturated polyester (generally abbreviated as SMC). However, the present invention is not limited thereto.

The materials may be used as they are or may be subjected to surface treatment such as degreasing or primer painting and/or intermediate painting. These treatments may be performed alone or in combination of two or more.

To repair a multilayer coating film previously applied on the material by using the painting composition, coating composition, ink composition or the adhesive composition of the present invention, it is preferable to first subject the coating film portion requiring a repair to solvent cleaning or sanding treatment and then paint.

The painting composition, coating composition, ink composition and adhesive composition of the present invention may be adjusted, before use, to have a specific viscosity which is suitable for a conventional coating method such as air spray, airless spray or electrostatic coating or for obtaining a desired film thickness. For example, to coat a plastic material, the aqueous painting composition is preferably adjusted, before use, to have a solid content of about 10 to 40% by weight and a viscosity of about 800 to 5,000 cps/6 rpm (measured with a B-type viscometer) by adding deionized water and, if necessary, additives such as a thickener and an antifoaming agent.

The aforementioned suitable materials may be coated with a monocoat of the painting composition, coating composition, ink composition or adhesive composition of the present invention, but an intermediate coating material can be applied, by a so-called wet-on-wet method or a wet-on-wet method after preheating, on the applied coating material of the painting composition, coating composition, ink composition or adhesive composition of the present invention. Meanwhile, after applying, on an electrodeposition film, a coating material of the painting composition, coating composition, ink composition or adhesive composition of the present invention, top coating can be performed by a wet-on-wet method or a wet-on-wet method after preheating. Preheating is a method for heating at 40 to 80° C. for 5 to 60 minutes, for example, at 80° C. for 5 minutes, and is performed by hot air heating, infrared irradiation or the like.

The dry film thickness of the painting composition, coating composition, ink composition or adhesive composition used for coating may vary depending on the coating method or the necessity, but may be usually about 10 to 50 μm.

The applied painting composition, coating composition, ink composition or adhesive composition is then completely or incompletely dried by settings at room temperature, air drying or dried by the forced drying using hot air drying or an infrared heater or the like, or in some cases, is completely or incompletely cured by being baked at a temperature of not more than 120° C. to obtain an aqueous coating film. In particular, to form an aqueous coating film on a plastic material according to the present invention, it is preferable to obtain an aqueous film by drying the water content to about not more than 25% by weight with air drying or hot air drying at 40 to 120° C. after coating. Alternatively, in order to repair a multilayer coating film, it is preferable to obtain an aqueous film by drying with an air blow or hot air up to 80° C. after coating.

Since the aqueous polyurethane resin composition of the present invention has good fluidity even when the composition has a high solid content, a coating material using the composition has good finished appearance. Moreover, the adhesion of the coating film using the composition to the substrate, particularly the adhesion to the electrodeposition coating film, is good, and excellent impact resistance is given even in a single coating (monocoat) system and a multilayer coating system. The aqueous polyurethane resin composition of the present invention is suitable as a raw material for an aqueous coating material to coat an electrodeposition film.

EXAMPLES

The present invention will be described in more detail by the following specific examples.

PolyTHF2000 is polytetramethylene ether glycol (OH value: 56 mgKOH/g; number average molecular weight: 2000 g/mol) available from BASF AG.

PolyTHF1000 is polytetramethylene ether glycol (OH value: 112 mgKOH/g; number average molecular weight: 1000 g/mol) available from BASF AG.

Desmophen 3600Z is a polypropylene oxide polyether polyol (OH value: 56 mg KOH/g: number average molecular weight: 2000 g/mol) available from Sumika Covestro Urethane Co. Ltd.

PolyTHF650 is polytetramethylene ether glycol (OH value: 173 mg KOH/g; number average molecular weight 650 g/mol) available from BASF AG.

Desmophen C2202 is polycarbonate polyol (OH value: 56 mgKOH/g; number average molecular weight: 2000 g/mol) available from Sumika Covestro Urethane Co., Ltd.

Desmophen 20281 is polyester polyol (OH value: 56 mgKOH/g; number average molecular weight: 2000 g/mol) available from Sumika Covestro Urethane Co., Ltd.

IPDI is isophorone diisocyanate (Desmodur 1) available from Sumika Covestro Urethane Co., Ltd.

HDI is hexamethylene diisocyanate (Desmodur 11) available from Sumika Covestro Urethane Co., Ltd.

W is 4,4'-diisocyanatodicyclohexylmethane (Desmodur W) available from Sumika Covestro Urethane Co., Ltd.

AAS is sodium 2-[(2-aminoethyl)amino]ethanesulfonate (product number: W01COBQV-7243) available from FUJIFILM Wako Pure Chemical Corporation.

DMPA is dimethylolpropionic acid (Bis-MPA) available from Tokyo Chemical Industry Co., Ltd.

AAP is sodium 3-[(2-aminoethyl)amino]propionate (product number: W01COBQV-3340) available from FUJIFILM Wako Pure Chemical Corporation.

EDA is ethylenediamine (E0077) available from Tokyo Chemical Industry Co., Ltd.

TMP is trimethylolpropane (T0480) available from Tokyo Chemical Industry Co., Ltd.

DEOA is diethanolamine (S0376) available from Tokyo Chemical Industry Co., Ltd.

DMEA is N,N-dimethylethanolamine (D0649) available from Tokyo Chemical Industry Co., Ltd.

[Method for Measuring General Viscosity of Aqueous Polyurethane Resin Composition]

Measurement was performed in accordance with JIS Z8803 by using a B-type rotational viscometer at 25° C.

[Method for Measuring Viscosity at Time of High Solid Content of Aqueous Polyurethane Resin Composition, in Particular in which the Aqueous Polyurethane Resin Composition has a Viscosity of not Less than 500 Pa·s and not More than 50,000 Pa·s when the Polyurethane Resin is Contained in an Amount of 65% by Weight.]

For the viscosity at the time of high solid content, for example, it is possible to measure the viscosity when the polyurethane resin is contained in an amount of not less than 65% by weight, by evaporating the aqueous medium in the aqueous polyurethane resin composition using an evaporator or the like to adjust the amount of the polyurethane resin contained. The viscosity was measured with a rheometer (for example AR-G2, manufactured by TA Instruments) at 25° C. The measurement conditions used were gap: 0.25 mm; geometry: cone plate type; diameter: 20 mm; cone angle: 0.042 radians; and rotation speed: 0.1 S-1.

[Method for Measuring Average Molecular Weight of Polyol Compound of Component (b)]

For the measurement of the average molecular weight of the polyol compound of the component (b), a conversion value obtained from a standard polystyrene calibration curve created in advance using gel permeation chromatography (GPC) was written.

[Method for Measuring Average Molecular Weight of Polyurethane Resin]

For the measurement of the average molecular weight of the polyurethane resin, a conversion value obtained from a standard polystyrene calibration curve created in advance using gel permeation chromatography (GPC) was written.

[Method for Calculating Acid Value of Polyurethane Resin]

A calculated value (mgKOH/g) is expressed in the number of mg of potassium hydroxide required to neutralize the carboxyl group or the sulfo group present in the polyurethane resin. The ratio of the acid value of the carboxyl group to the total acid value is calculated by the following formula. The total acid value refers to the sum total of the acid value of the carboxyl group and the acid value of the sulfo group.

Ratio of Acid Value of Carboxyl Group to Total Acid Value=$AV_{[COOH]}(AV_{[COOH]}+AV_{[SO3H]})$ $AV_{(total)}$: Total acid value ($AV_{[COOH]}+AV_{[SO3H]}$) in polyurethane resin.

$AV_{[COOH]}$: Acid value derived from carboxyl group in polyurethane resin $AV_{[SO3H]}$: Acid value derived from sulfo group in polyurethane resin

[Method for Measuring Hydroxyl Value of Polyurethane Resin]

The hydroxyl value of the polyurethane resin was measured in accordance with the B method of JIS K 1557.

Production Example 1: Aqueous Polyurethane Resin Composition Example 1 (PUD No. 1)

In a reaction vessel equipped with a stirrer and a heating device, 4.19 parts by weight of PolyTHF1000 (component b1), 19.59 parts by weight of PolyTHF2000 (component b2) and 0.69 parts by weight of DMPA (component c) were charged and heated to 70° C. Next, a mixture of 2.28 parts by weight of hexamethylene diisocyanate (component a1) and 3.02 parts by weight of isophorone diisocyanate (component a2) was added, and the mixture was stirred at 100 to 115° C. until the mixture had a value slightly below the theoretical NCO value. The finished prepolymer was dissolved in acetone at 50° C. to get a solution with concentrate of around 40%. Then after performing the neutralizing treatment by adding 0.46 parts by weight of DMEA, a solution of 0.28 parts by weight of ethylenediamine (component d1), 0.31 parts by weight of AAS (component c) and 5.0 parts by weight of deionized water were measured and inputted. The second stirring time was 15 minutes. Dispersion was then performed by adding 64.18 parts by weight of deionized water. Next, the solvent was removed by distillation under vacuum to obtain a dispersion having a solid content of 30.82% by weight and a viscosity of 2194 mPa·s (25° C., B-type viscometer, JIS Z8803).

Production Examples 2 to 10 (Aqueous Polyurethane Resin Composition Examples 2 to 10 (PUD No. 2 to 10)) and Aqueous Polyurethane Resin Composition Comparative Examples 1 to 6 (PUD No. 11 to 16)

Aqueous polyurethane resin compositions Nos. 2 to 16 were obtained by the same operations as in the production example of the aqueous polyurethane resin composition (PUD No. 1) with the formulation shown in Table 1 below.

Table 1 shows the composition of the aqueous urethane resin composition and the value of the viscosity at each concentration (unless otherwise specified, the values in the table represent parts by weight).

TABLE 1

TABLE 1 FORMULATION CONTENTS OF AQUEOUS POLYURETHANE RESIN COMPOSITION

| | AQUEOUS POLYURETHANE RESIN COMPOSITION EXAMPLES | | | | | | | | | | AQUEOUS POLYURETHANE RESIN COMPOSITION COMPARATIVE EXAMPLES | | | | | |
|---|---|---|---|---|---|---|---|---|---|---|---|---|---|---|---|---|
| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
| AQUEOUS POLYURETHANE RESIN COMPOSITION NUMBER (PUD No.) | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 | No. 16 |
| PolyTHF 1000 | 4.19 | 4.22 | 2.23 | 4.31 | 2.38 | 4.30 | 7.71 | 4.15 | 3.45 | 4.23 | 3.11 | | | | | 4.45 |
| PolyTHF 2000 | 19.59 | 19.75 | 22.26 | 20.16 | 23.79 | 20.13 | 15.42 | 19.35 | 16.12 | 19.76 | 14.51 | | | | | 20.72 |
| DESMOPHEN 3600Z | | | | | | | | | | | | 21.57 | | | | |
| PolyTHF 650 | | | | | | | | | | | | | 19.63 | | | |
| DESMOPHEN C2202 | | | | | | | | | | | | | | 21.91 | | |
| DESMOPHEN 20281 | | | | | | | | | | | | | | | 25.2 | |
| IPDI | 3.02 | 3.04 | 2557 | 2.87 | 2.37 | 3.00 | 4.61 | 4.42 | 1.39 | 2.81 | 7.15 | 3.87 | 9.14 | 3.48 | 3.04 | 2.96 |
| HDI | 2.28 | 2.31 | 2.10 | 2.17 | 1.80 | 2.27 | 1.16 | 113 | 6.51 | 2.13 | 1.8 | 2.93 | | 2.64 | 2.29 | 2.22 |
| W | | | | | | | | | 0.39 | | | | | | | |
| AAS | 0.31 | 0.19 | 0.19 | 0.16 | 0.2 | 0.29 | 0.3 | 0.3 | 1.53 | 0.27 | | | | | | |
| LMPA | 0.69 | 0.69 | 0.39 | 0.53 | 0.46 | 0.67 | 0.61 | 0.62 | | | 1.66 | 1.65 | 0.96 | 1.80 | 0.95 | 0.41 |
| AAP | | | | | | | | | | | | | | | | |
| EDA | 0.28 | 0.33 | 0.07 | 0.31 | 0.10 | 0.28 | 0.32 | 0.32 | 0.39 | 0.81 | 1.05 | 0.54 | 0.19 | 0.35 | 0.35 | 0.51 |
| TMP | | | 0.40 | | | | | | | 0.21 | | | | | | |
| DMOA | | | 0.24 | | | | | | | | | | | | | |
| DMEA | 0.46 | 0.46 | 0.26 | 0.36 | 0.30 | 0.45 | 0.28 | 0.41 | 0.99 | | 1.10 | 0.86 | 0.71 | 0.89 | | |
| DEIONIZED WATER | 69.18 | 69.01 | 69.09 | 69.13 | 68.60 | 68.60 | 69.58 | 69.31 | 69.22 | 69.78 | 69.63 | 68.57 | 69.37 | 68.93 | 68.18 | 68.72 |
| TOTAL | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| SOLID CONTENT | 30.82 | 30.99 | 30.91 | 30.87 | 31.40 | 31.40 | 30.42 | 30.73 | 30.80 | 30.22 | 30.37 | 31.43 | 30.63 | 31.07 | 31.82 | 31.28 |
| ACID VALUE OF | 9.4 | 9.4 | 5.3 | 7.3 | 6.1 | 8.9 | 8.4 | 8.4 | 20.9 | 11.4 | 22.8 | 22.0 | 13.1 | 24.2 | 0.0 | 0.0 |

TABLE 1-continued

TABLE 1 FORMULATION CONTENTS OF AQUEOUS POLYURETHANE RESIN COMPOSITION

| | AQUEOUS POLYURETHANE RESIN COMPOSITION EXAMPLES | | | | | | | | | | AQUEOUS POLYURETHANE RESIN COMPOSITION COMPARATIVE EXAMPLES | | | | | |
|---|---|---|---|---|---|---|---|---|---|---|---|---|---|---|---|---|
| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
| CARBOXYL GROUP (mgKOH/g) | 0.73 | 0.82 | 0.72 | 0.81 | 0.74 | 0.74 | 0.72 | 0.72 | 0.83 | 0.79 | 1.00 | 1.00 | 1.00 | 1.00 | 0.00 | 0.00 |
| RATIO OF ACID VALUE OF CARBOXYL GROUP | | | | | | | | | | | | | | | | |
| VISCOSITY @ 23° (mPas) | 2194 | 2431 | 51 | 42 | 37 | 311 | 8 | 10 | 322 | 31 | 228 | 7 | 8 | 15 | 8 | 32 |
| VISCOSITY (SOLID CONTENT 65%, Pa·s) | 11500 | 12000 | 13000 | 13000 | 12000 | 40000 | 550 | 2150 | 17000 | 6000 | 60000 | 2800 | 12000 | 80000 | 15000 | 15000 |
| VISCOSITY (SOLID CONTENT 80%, Pas) | 13000 | 18000 | 23000 | 25000 | 15000 | 100000 | 700 | 3000 | 20000 | 20000 | 170000 | 30000 | 25000 | N/A | 200000 | 80000 |
| VISCOSITY CHANGE RATE (80% SOLID CONTENT/ 65% SOLID CONTENT) | 13% | 50% | 177% | 92% | 25% | 150% | 27% | 40% | | | | | | | | |
| AMOUNT OF POLYOL CONTAINED | 77% | 77%, | 79% | 79% | 83% | 78% | 76%, | 76% | 64% | 79% | 58%, | 69% | 64% | 71% | 79% | 80% |

Setaqua B E270 is a polyester dispersion (OH value: 96 mgKOH/g; number average molecular weight: 1000 g/mol) available from Nuplex Industries Ltd.

Envirogem AD-01 is a surface conditioner available from Air Products Japan K.K.

TEGO WET 775W is a pigment dispersant available from Evonik Japan Co., Ltd.

JR-806 is titanium white available from Teyka Corporation.

[Pigment Dispersion Paste]

11.30 parts by weight of the polyester dispersion Setaqua B E 270 was charged into a stainless steel cylindrical stirring tank with a stirrer, and 25.30 parts by weight of ion-exchanged water was added with stirring. Next, 1.60 parts by weight of DMEA 10% aqueous solution was added, and 1.60 parts by weight of the pigment dispersant TEGO WET 775W was added with stirring. With sufficient stirring, 1.30 parts by weight of the surface conditioner Envirogem AD-01 was added. While continuing to stir, 58.90 parts by weight of the titanium oxide JR-806 was then charged and stirred for 15 minutes until the whole became uniform with sufficient stirring to create a pigment mill base. The mill base was subjected to pigment dispersion using a paint shaker to create a pigment dispersion paste for an aqueous primer. This had a non-volatile content of 68.8% and a pigment concentration (PWC) of 85.0%.

The compounding ratio of the pigment dispersion paste is as shown in Table 2 below.

TABLE 2

| PRODUCTION OF PIGMENT DISPERSION PASTE COMPOSITION FORMULATION (PARTS BY WEIGHT) | |
| --- | --- |
| Setaqua B E270 | 11.30 |
| DEIONIZED WATER | 25.30 |
| DMEA 10% AQUEOUS SOLUTION | 1.60 |
| Envirogem AD-01 | 1.30 |
| TEGO WET 775W | 1.60 |
| JR-806 | 58.90 |
| TOTAL | 100.00 |
| SOLID CONTENT | 68.77 |
| PWC | 85% |

Cymel 327 is a melamine resin available from Mitsui-Cytec Ltd.

Bayhydrol A 2770 is an acrylic dispersion available from Sumika Covestro Urethane Co., Ltd.

Byhidule BL 2781 is a block isocyanate available from Sumika Covestro Urethane Co., Ltd.

[Production of Aqueous Painting Composition No. 1]

31.1 parts by weight of the pigment dispersion paste produced based on Table 2, 21.8 parts by weight of the aqueous polyurethane resin composition No. 1 prepared in Production Example 1, 1.6 parts by weight of melamine resin Cymel 327, 19.4 parts by weight of the acrylic dispersion Bayhydrol A 2770, 21.8 parts by weight of the block isocyanate Byhidule BL 2781 and 4.3 parts by weight of deionized water were added and stirred sufficiently to obtain an aqueous painting composition No. 1 having a solid content of 47% by weight. Thereafter, in order to obtain a viscosity that enables spray coating, a Ford cup No. 4 was used for adjustment by adding deionized water so that a viscosity of about 40 seconds was obtained at 20° C.

[Creation of Coated Plate for Evaluation]

The aqueous painting composition No. 1 was air-sprayed to coat an electrodeposited steel sheet so that the dry film thickness was 35 to 40 μm, and baked at 140° C. for 30 minutes to obtain a test plate for evaluation.

Production of Aqueous Painting Compositions Nos. 2 to 10 (Examples 2 to 10)

By performing the same operations as in the production example of the aqueous painting composition No. 1 with the formulation shown in Table 3 below, aqueous painting compositions Nos. 2 to 10 were prepared, and coated plates for evaluation were created with the same procedure.

Aqueous Painting Compositions Nos. 11 to 16 (Comparative Examples 1 to 6)

By performing the same operations as in the production example of the aqueous painting composition No. 1 with the formulation shown in Table 3 below, aqueous painting compositions Nos. 11 to 16 were prepared, and coated plates for evaluation were created with the same procedure.

[Testing Method]

[Method for Measuring Finished Appearance]

A multilayer coating film was created by vertical coating, and the gloss level of the coating film was measured in accordance with the 60° specular glossiness of JIS K-5400 7.6 (1990). A gloss value of not less than 90 indicates that the finished appearance is excellent, and is denoted by ⊙. A gloss value of not less than 80 and less than 90 is denoted by ◯, not less than 70 and less than 80 by Δ, and less than 70 by x.

[Method for Measuring Impact Resistance]

Chipping resistance: A test plate was installed on a test piece holder of a gravel test instrument JA-400 (manufactured by Suga Test Instruments Co., Ltd, the trade name, a chipping test apparatus); 50 g of a crushed granite stone of a grain size number 7 was blown to the coated surface by compressed air of 0.441 MPa (4.5 kgf/cm2) at −20° C.; and the degree of damage on the coating film due to the stone was visually observed and evaluated.

Evaluation: State of Coating Film

◯: The size of the damage is small to an extent that the electrodeposition film is exposed Δ: The size of the damage is small, but the base steel sheet is exposed x: The size of the damage is very large, and the base steel sheet is also greatly exposed

[Method for Measuring Adhesion]

Across-cut adhesion test (100 squares with 1×1 mm in size, tape peeling) was performed.

◯: Number of Remaining Squares 100/100
Δ: Number of Remaining Squares 95-99/100
x: Number of Remaining Squares less than 95/100

Table 3 summarizes the respective results of the evaluation test (unless otherwise specified, the values in the table represent parts by weight)

TABLE 3

TABLE 3 FORMULATION CONTENTS AND VARIOUS MEASUREMENT RESULTS OF AQUEOUS PAINTING COMPOSITION

| | AQUEOUS PAINTING COMPOSITION EXAMPLES | | | | | | | | | | AQUEOUS PAINTING COMPOSITION COMPARATIVE EXAMPLES | | | | | |
|---|---|---|---|---|---|---|---|---|---|---|---|---|---|---|---|---|
| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
| COMPOSITION FORMULATION (PARTS BY WEIGHT) | | | | | | | | | | | | | | | | |
| AQUEOUS POLYURETHANE RESIN COMPOSITION NUMBER | | | | | | | | | | | | | | | | |
| PIGMENT DISPERSION PASTE | 31.1 | 31.1 | 31.1 | 31.2 | 31.0 | 31.0 | 31.2 | 31.2 | 31.1 | 31.2 | 31.2 | 31.1 | 31.1 | 31.1 | 31.1 | 31.1 |
| PUD No. 1 | 21.8 | | | | | | | | | | | | | | | |
| PUD No. 2 | | 21.6 | | | | | | | | | | | | | | |
| PUD No. 3 | | | 21.6 | | | | | | | | | | | | | |
| PUD No. 4 | | | | 21.6 | | | | | | | | | | | | |
| PUD No. 5 | | | | | 21.4 | | | | | | | | | | | |
| PUD No. 6 | | | | | | 21.4 | | | | | | | | | | |
| PUD No. 7 | | | | | | | 21.8 | | | | | | | | | |
| PUD No. 8 | | | | | | | | 21.6 | | | | | | | | |
| PUD No. 9 | | | | | | | | | 21.5 | | | | | | | |
| PUD No. 10 | | | | | | | | | | 21.5 | | | | | | |
| PUD No. 11 | | | | | | | | | | | 20.9 | | | | | |
| PUD No. 12 | | | | | | | | | | | | 21.1 | | | | |
| PUD No. 13 | | | | | | | | | | | | | | | | |
| PUD No. 14 | | | | | | | | | | | | | | 21.3 | | |
| PUD No. 15 | | | | | | | | | | | | | | | 20.8 | |
| PUD No. 16 | | | | | | | | | | | | | | | | 21.5 |
| CYMEL 327 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 |
| BAYHYDROL A 2770 | 19.4 | 19.5 | 19.5 | 19.6 | 19.5 | 19.5 | 19.5 | 19.5 | 19.6 | 19.6 | 19.8 | 19.5 | 19.6 | 19.6 | 19.5 | 19.5 |
| BYHIDULE BL 2781 | 21.8 | 21.8 | 21.8 | 21.9 | 21.9 | 21.9 | 21.8 | 25.9 | 21.9 | 22.0 | 22.2 | 21.9 | 21.9 | 21.9 | 21.9 | 21.8 |
| DEIONIZED WATER | 4.3 | 4.4 | 4.4 | 4.2 | 4.6 | 4.6 | 4.1 | 4.3 | 4.4 | 4.1 | 4.4 | 4.8 | 4.2 | 4.6 | 5.0 | 4.6 |
| TOTAL | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |

TABLE 3-continued

TABLE 3 FORMULATION CONTENTS AND VARIOUS MEASUREMENT RESULTS OF AQUEOUS PAINTING COMPOSITION

| | AQUEOUS PAINTING COMPOSITION EXAMPLES | | | | | | | | | | AQUEOUS PAINTING COMPOSITION COMPARATIVE EXAMPLES | | | | | |
|---|---|---|---|---|---|---|---|---|---|---|---|---|---|---|---|---|
| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
| PAINTING SOLID CONTENT | 47.00 | 47.00 | 47.00 | 47.00 | 47.00 | 47.00 | 47.00 | 47.00 | 47.00 | 47.00 | 47.00 | 47.00 | 47.00 | 47.00 | 47.00 | 47.00 |
| APPEARANCE (60 DEGREE GLOSS, 90 OR MORE) | ⊙ 93 | ⊙ 90 | ○ 85 | ○ 89 | ⊙ 92 | ⊙ 85 | ○ 89 | ⊙ 90 | ○ 85 | ○ 85 | X 60 | X 63 | ○ 88 | X 52 | X 65 | △ 72 |
| CHIPPING RESISTANCE | ⊙ | ⊙ | ○ | ⊙ | ⊙ | ⊙ | ○ | ⊙ | ○ | ○ | X | X | X | X | X | ⊙ |
| CROSS-CUT ADHESION | 100/100 | 100/100 | 100/100 | 100/100 | 100/100 | 100/100 | 100/100 | 100/100 | 100/100 | 100/100 | 100/100 | △ 95/100 | 99/100 | X 89/100 | ⊙ 100/100 | ⊙ 100/100 |

From the results in Table 3, it can be seen that the aqueous painting composition of the present invention has good finished appearance, good adhesion to an electrodeposition film and excellent impact resistance.

INDUSTRIAL APPLICABILITY

Since the aqueous polyurethane resin composition of the present invention has good fluidity even when the composition has a high solid content, a coating material using the composition has good finished appearance. Moreover, the adhesion of the coating film using the composition to the substrate, particularly the adhesion to the electrodeposition coating film, is good, and excellent impact resistance can be given even in a single coating (monocoat) system and a multilayer coating system. Accordingly, the aqueous polyurethane resin composition of the present invention is suitable as a raw material for an aqueous coating material to coat an electrodeposition film.

According to the present invention, it is possible to obtain an aqueous polyurethane resin composition having excellent finished appearance and, adhesion to an electrodeposition film and impact resistance, which are contradictory required properties. The aqueous polyurethane resin composition of the present invention can be widely used as a raw material for painting compositions, coating compositions, ink compositions, adhesive compositions and the like.

The invention claimed is:

1. An aqueous polyurethane resin composition comprising a polyurethane resin obtained from at least components (a) to (d) below:
   (a) at least compound (1) at least one alicyclic diisocyanate compound selected from the group consisting of 4,4'-diisocyanatodicyclohexylmethane and isophorone diisocyanate, and compound (2) hexamethylene diisocyanate, the alicyclic diisocyanate compounds (1) comprising 40 to 60 mol % based on 100 mol % of the organic diisocyanate compounds of component (a);
   (b) one or more polyol compounds comprising 75 to 100% by weight of polytetramethylene glycol polyol based on the total weight of polyol compounds (b);
   (c) acidic group-containing compounds comprising at least two types of compounds which are a compound containing a carboxyl group as the acid group (a carboxyl group-containing compound) and a compound containing a sulfo group as the acid group (a sulfo group-containing compound); and
   (d) a chain extender selected from the group consisting of a polyamine compound, a diamine compound, a polyol compound and an alkanolamine compound, the chain extender having a molecular weight of not more than 400,
   wherein the aqueous polyurethane resin composition has a viscosity of not less than 500 Pa·s and not more than 50,000 Pa·s when the polyurethane resin is contained in an amount of 65% by weight;
   wherein component (a) is 13 to 20% by weight of the polyurethane resin, and
   wherein component (b) is 65 to 85% by weight of the polyurethane resin.

2. The aqueous polyurethane resin composition according to claim 1, wherein the acidic group-containing compound of the component (c) is a compound having two or more hydroxy groups or amino groups.

3. The aqueous polyurethane resin composition according to claim 1, wherein the alicyclic diisocyanate compound is contained by a percentage of not more than 80 mol % based on 100 mol % of the organic diisocyanate compounds of the component (a).

4. The aqueous polyurethane resin composition according to claim 1, wherein the component (b) has a number average molecular weight of more than 400 g/mol and not more than 6000 g/mol.

5. The aqueous polyurethane resin composition according to claim 1, wherein the component (c) is present in the polyurethane resin in an amount that a total weight of the carboxyl group-containing compound and the sulfo group-containing compound is 0.2 to 10% by weight.

6. The aqueous polyurethane resin composition according to claim 1, wherein a ratio of an acid value of the carboxylic group to a total acid value in the component (c) is 0.20 to 0.95.

7. The aqueous polyurethane resin composition according to claim 1, wherein the acid value of the carboxylic group in the polyurethane resin is in the range from 4.5 to 30 mgKOH/g.

8. The aqueous polyurethane resin composition according to claim 1, wherein the polyurethane resin is contained by a percentage of 20 to 65% by weight.

9. A painting composition, coating composition, ink composition or adhesive composition containing the aqueous polyurethane resin composition according to claim 1.

10. The aqueous polyurethane resin composition of claim 1, wherein component (b) is 70 to 85% by weight of the polyurethane resin.

* * * * *